United States Patent [19]

Moore

[11] Patent Number: 5,592,561

[45] Date of Patent: Jan. 7, 1997

[54] ANTI-COUNTERFEITING SYSTEM

[76] Inventor: Lewis J. Moore, 6225 Padget Parrish Ct., Charlotte, N.C. 28270

[21] Appl. No.: 420,034

[22] Filed: Apr. 11, 1995

Related U.S. Application Data

[63] Continuation-in-part of Ser. No. 227,662, Apr. 14, 1994, abandoned.

[51] Int. Cl.$^6$ ............................... G06K 9/00; G09C 3/08
[52] U.S. Cl. .................. 382/103; 382/141; 382/100; 380/51
[58] Field of Search ....................... 382/112, 135, 382/163, 103, 141, 100; 380/51, 55, 23, 59; 235/462

[56] References Cited

U.S. PATENT DOCUMENTS

| | | | |
|---|---|---|---|
| 3,701,165 | 10/1972 | Huddleston | 112/262 |
| 3,839,637 | 10/1974 | Willis | 250/302 |
| 3,942,154 | 3/1976 | Akami et al. | 250/226 |
| 3,991,706 | 11/1976 | Pearl | 118/7 |
| 4,150,781 | 4/1979 | Silverman et al. | 235/382 |
| 4,623,579 | 11/1986 | Quon | 428/215 |
| 4,637,051 | 1/1987 | Clark | 382/100 |
| 4,767,205 | 8/1988 | Schwartz et al. | 356/71 |
| 4,864,618 | 9/1989 | Wright et al. | 380/51 |
| 4,972,475 | 11/1990 | Sant'Anselmo | 380/54 |
| 4,982,437 | 1/1991 | Loriot | 382/111 |
| 5,075,862 | 12/1991 | Doeberl et al. | 395/117 |
| 5,142,577 | 8/1992 | Pastor | 380/51 |
| 5,227,617 | 7/1993 | Christopher | 235/462 |
| 5,283,422 | 2/1994 | Storch et al. | 235/375 |
| 5,285,382 | 2/1994 | Nuehlberger | 364/401 |
| 5,289,547 | 2/1994 | Ligas et al. | 382/135 |
| 5,337,361 | 8/1994 | Wang et al. | 380/51 |

FOREIGN PATENT DOCUMENTS 0328320  2/1989  European Pat. Off. ......... D06Q 1/00

*Primary Examiner*—Leo Boudreau
*Assistant Examiner*—Monica S. Davis
*Attorney, Agent, or Firm*—Gunn & Associates, P.C.

[57] ABSTRACT

A system and method of marking goods for authentication and tracking purposes is described. The system and method include a central control which enables the system. The method and system are accomplished in real time, affording manufacturers the ability to eliminate problems associated with counterfeiting and diversion which begin at the manufacturing site. A central control unit enables the system by providing an allotment of goods to a host unit. The host unit directs printing terminals to mark particular goods with specific information encoding symbols. Following marking, goods are scanned to insure proper marking and then packaged for shipment. Following marking, the goods can be checked by illuminating the symbols printed thereon and cross referencing this data with the host database by using a field reading unit.

17 Claims, 3 Drawing Sheets

FIG.3
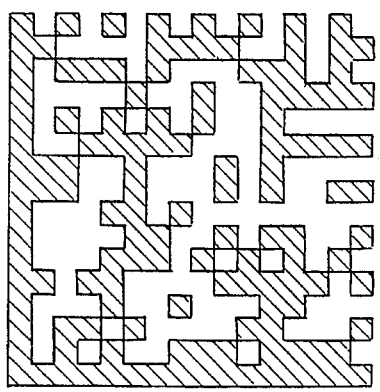
FIG.3A
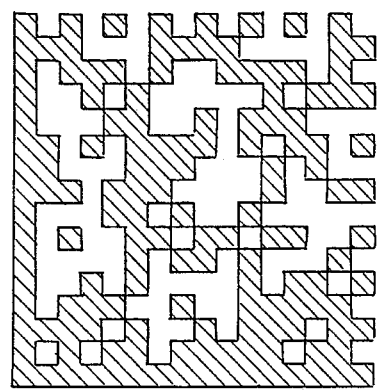
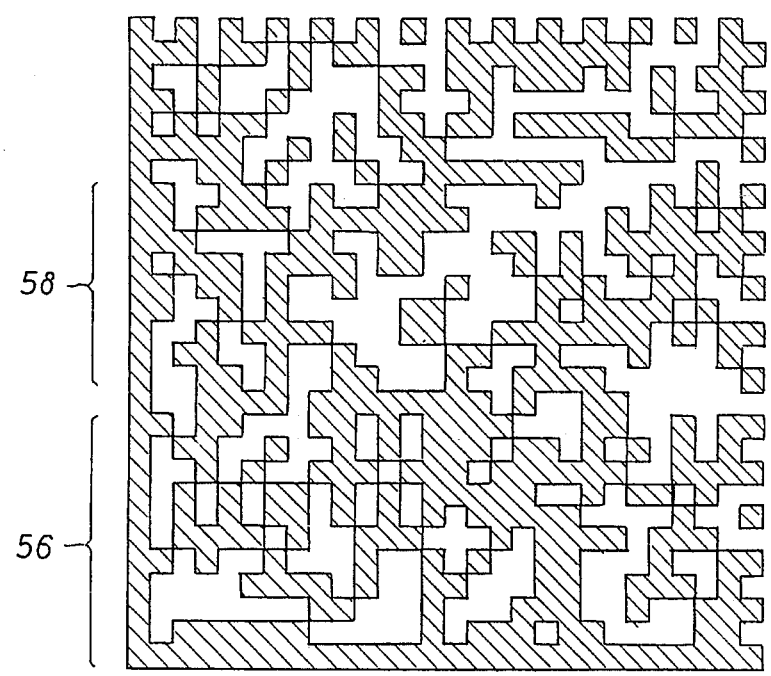
FIG.3B
FIG.6
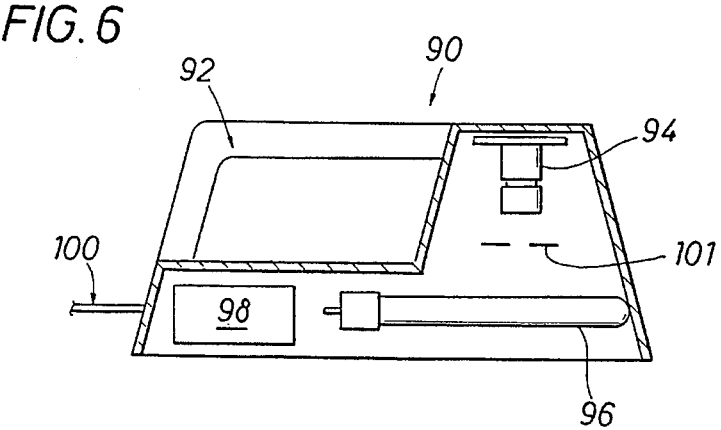
FIG.7
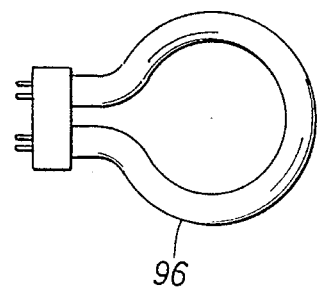

ANTI-COUNTERFEITING SYSTEM

This is a continuation-in-part application of U.S. Ser. No. 08/227,662 filed on Apr. 14, 1994, now abandoned.

FIELD OF THE INVENTION

The present invention relates to an authenticating, anti-counterfeiting, anti-diversion tracking system. More particularly, the present invention relates to a system for controlling and enabling the marking and controlling the marking of goods during the manufacturing process with a unique mark, symbol, or pattern for subsequent detection to determine such information as the amount of unmarked goods in the market, i.e., counterfeit goods, the source of entry of the unmarked goods, the authenticity of the goods, the product distribution channels for the goods, the durability and/or lifetime of the goods, and other information.

BACKGROUND OF THE INVENTION

In the commercial manufacturing world, it is not uncommon for counterfeit goods to be manufactured, distributed, and sold in direct competition with authentic goods. Counterfeiting has reached epidemic proportions worldwide, especially in the area of consumer goods including goods made from fabric, plastic, leather, metal, or combinations thereof such as clothing, handbags and wallets, perfumes, and other consumer goods.

It is common for the counterfeit articles to be of high quality and closely resemble authentic articles. Indeed, counterfeit articles can so closely resemble genuine goods that consumers readily confuse the counterfeit articles with the authentic articles. Thus, there exists a need for a system and method which enable a manufacturer to encode data represented by a mark or symbol, to direct marking of goods with the mark or symbol, and to enable remote inspection stations to check goods for authentic marks or symbols and track authentic goods. Heretofore, such a comprehensive system was not available.

For example, certain known systems suggest marking goods with different patterns. However, such systems do not suggest a system that directs the marking of goods with a selected mark and the detection of the marks at remote locations. The patents described below represent the art in the area of marking and detecting goods.

U.S. Pat. No. 5,289,547, issued on Feb. 22, 1994, discloses a method for authenticating articles including incorporating into a carrier composition a mixture of at least two photochromic compounds that have different absorption maxima in the activated state and other different properties to form the authenticating display data on the article, subjecting the display data to various steps of the authenticating method, activation of all photochromic compounds, preferential bleaching of less than all of the photochromic compounds, and/or bleaching of all the photochromic compounds, and subsequent examination of the display data following the various activation and bleaching steps by verifying means to enable authentication.

U.S. Pat. No. 4,767,205, issued on Aug. 30, 1988, discloses an identification method and identification kit based upon making up groups of microsized particles normally visible to the naked eye with each particle in each group being of a selected uniform size, shape and color. Coded identification is established by transferring a population of particles from a selected number of the groups to the item to be identified and then confirming such identification by examining the marked item under high magnification with a light microscope.

U.S. Pat. No. 4,623,579, issued on Nov. 18, 1986, discloses a decorative composite article which may be longitudinally slit to form a yarn product which has a combined phosphorescent and fluorescent decorative appearance. The composite article includes paired outer layers of a thermoplastic resin between which is disposed a decorative layer comprising a composition including a colorant component having a phosphorescent colorant and a fluorescent colorant, and a resin binder material. The fluorescent colorant is present in an amount by weight that is up to an amount equal to that of the phosphorescent colorant. The present binder material may be selected from polyester, polyurethane and acrylic polymers and copolymers, with a mixture of butadiene-acrylonitrile rubber and polyurethane composition being preferred. The composite article is prepared by coating two resin films with the composition, followed by contacting the films with each other on their coated surfaces and applying heat and pressure to bond them together to form the decorative composite article.

U.S. Pat. No. 3,942,154, issued on Mar. 2, 1976, discloses a method and apparatus for recognizing colored patterns. The method includes encoding the colors of individual picture elements in a fabric pattern by comparing the level of transmittance or reflectance of the picture element at pre-selected wavelengths with stored values representing a reference color to generate a multibit code indicative of the color of the picture element. A comparator used for this purpose incorporates an error either proportional to the wavelength or of constant value so that the output of the comparator will indicate identity with the stored value if the input value for the picture element is within a certain range of the stored value.

U.S. Pat. No. 3,839,637, issued on Oct. 1, 1974, discloses the impregnation of spaced courses of yarn in a fabric with a material which is not visible under daylight, but which is visible only when subjected to ultra-violet light, so as to provide guide lines for cutting, or measuring indicia to enable visual counting of the number of yards of cloth in a roll from the end thereof without the necessity of unrolling the bolt.

U.S. Pat. No. 3,701,165, issued on Oct. 31, 1972, discloses a method of marking garments with a substance detectable by magnetic detecting devices. When the magnetized substance on the garment part is detected in a process of making garments, subsequent garment making steps are actuated in response to the detection of the stitching.

U.S. Pat. No. 5,289,547, issued on Feb. 22, 1994, discloses a method of cutting a sheet with a tool controlled by a computer system and in accordance with a cutting program wherein an operator marks certain particularities directly on the sheet using a fluorescent marker, the sheet is exposed to ultraviolet light while being scanned by a camera, the marking being interpretable as constraints on cutting to be taken into account by the cutting program, and cutting occurs following the instructions interpreted from the encoded pattern.

U.S. Pat. No. 3,991,706, issued on Nov. 16, 1976, discloses an automatically controlled cutting machine having a support table on which limp sheet material is spread for cutting by means of a cutting tool and includes a marking apparatus to identify key points on pattern pieces cut from the sheet material. The cutting tool and the marking apparatus are mounted on a tool platform for movement to any desired location over the sheet material. The marking apparatus utilizes a needle which is suspended above the sheet material and a dye thread which is laced through an eyelet in the depending end of the needle. Each time a mark is to be generated, the needle plunges downwardly through the sheet material, and dye on the thread is rubbed onto the material at the point under consideration. An indexing mechanism operated with the reciprocating movement of the needle pulls a finite length of thread through the eyelet after each marking operation.

Thus, there remains a need for a system and method for controlling, enabling, and directing marking of goods during the manufacturing process and enabling detection/cross-validation of the marks so that the goods are uniquely identified and tracked throughout the stream of commerce. In addition, goods should be marked so that the markings are not readily observable and so that the markings contain sufficient information for product authentication, identification, and tracking.

SUMMARY OF THE INVENTION

The present invention provides an authenticating, tracking/anti-diversion, and anti-counterfeiting system which can track various goods. The system includes a control computer, a host computer, a marking system, and a field reader system, which are all compatible and can be physically linked via data transmission links. An identifiable mark is placed on the goods, or on materials out of which the goods are to be made, which enables subsequent inspection. The goods can be field inspected with a field reader to determine the authenticity of the goods or to track the distribution of the goods.

In one embodiment of the present invention, inspection uses light outside the visible spectrum to briefly illuminate marks on the goods under inspection. Through the use of responsive chemical agents such as dyes, that on exposure to non-visible light undergo a chemical, physical, and/or chemical-physical transformation making the marks detectable, an inspector can quickly determine whether the accused goods are marked and, if so, whether the mark is authentic. A mark, symbol, or pattern encoding input data conveying information about the goods is applied directly to the goods or to the material out of which the goods are to be made. The unique mark, symbol, or pattern encoding specific identification data can be tailored to meet the needs of a particular manufacturer. The mark contains specific information which is unique to the goods, not readily observable in visible light and which can be rendered detectable and readable upon exposure to non-visible light.

The preferred marks or patterns include areas where a marking agent is applied and areas where it is not applied. The pattern can be scanned or captured by a reader and deciphered into encoded data. The entry can then either be compared directly to a set of authentic entries on a database or decoded and the decoded data compared to a set of data on the centrally located host database.

The system of the present invention is generally comprised of a control computer, a host computer, a printing system, and a reading system. The host computer stores the specific, selected information conveyed by the mark or symbol and directs the marking system to imprint the mark or symbol on the material or goods and also receives and processes information from the reading system. The host computer is connected via modem to coordinate, receive, and respond to commands sent and received from the control computer, a printer terminal, and a reading terminal.

In operation, the control computer contacts the host computer and enables a specific number of imprints. The host computer establishes an appropriate identifying message using clear text. The host interfaces with an encryption unit which converts the clear text message into an ID matrix symbol. The host then downloads the digital symbol to the CPU controlling the printer. The host also establishes printer start/stop serialized numbers and specific times the printer can be in operation. Once the print cycle begins, a CCD camera mounted downstream from the printer maintains a continuous validation step that an appropriate symbol is being printed onto the product. If the printed symbol is different from that provided by the CPU, an error signal is activated to alert the operator. At the conclusion of the printing cycle, the printer CPU uploads a print count to the host.

From this point forward, marked products can be identified and verified through the use of field readers. The products are identified and verified by using a light of appropriate wavelength to illuminate the symbol on the products. The illuminated symbol is captured by the camera. The captured image is then transferred to a portable PC where the data is enhanced if necessary, compressed, and transmitted via modem, cellular link, or satellite communication to the host.

The host receives the data from the field reader, interfaces with the encryption unit where the message is decoded and converted to clear text. The host then searches the database to validate the identifying message. Once validated, the host sends a message back to the field reader which displays the decoded message and any other pertinent information pertaining to this specific product. If the marked product is counterfeit, an invalid signal is transmitted and displayed on the field reader computer screen.

To further enhance security, all transmissions between the control computer, host computer, printer CPU, and field readers are conducted through enigma cards placed in each computer at the time of manufacture and initialized when the network is activated.

The control computer provides an allotment of prints to the host computer. This communication is carried out via corresponding enigma cards which are located in the respective computers. Once the host computer has received an allotment of prints, it is able to enable printing systems to imprint marks on the articles or goods as specified. The host computer is limited in its ability to enable the printing systems to impart marks to the extent that the control computer has provided to the host the requisite number of prints to cover the directions sent to the printing systems.

The host computer interfaces with the encryption unit to generate a data matrix symbology which represents specified information that the manufacturer selects represented by the mark or symbol. Selected information, which represents the mark or symbol, is entered into the host terminal. The encoded mark or symbol is sent via modem to a manufacturing site where the encoded mark or symbol is received by the printer terminal and is printed onto material or goods at the remote marking location. This matrix is downloaded to the printing system for printing the goods. Following the placement of the print, a verification of the printed mark is conducted by a camera which compares the mark as printed with the mark directed by the printer PC. The goods can then be scanned by a field reader to verify authentic marks. Once the reader has captured the data from the scanned mark, communication is established by the reader with the host computer. The host computer compares the scanned mark with marks in its database to determine the authenticity of the mark or to track the goods.

The present invention provides a method for controlling and enabling the authentication and tracking of consumer goods to reduce the amount of counterfeit goods. The method includes generating a unique pattern comprising an encoded input data entry stored on a mass storage device accessible by a CPU where the input data comprises a unique owner identifier and a unique manufacturer identifier and where the encoded data entry comprises a digital encoding of the input data. The unique pattern is applied to the goods using an ink formulation comprising one or more chemical agents detectable when exposed to a visible or non-visible frequency range of light. The method further comprises exposing the goods with light in the visible or non-visible frequency range thereby making the pattern detectable, scanning the detectable pattern on the goods, decoding the pattern to retrieve the encoded data, and comparing the encoded data against stored encoded input data entries in the mass storage device data to determine if the goods are authentic.

The present invention provides a method for authenticating consumer goods to reduce the amount of counterfeit goods including a means for generating a unique pattern comprising an encoded input data entry stored on a mass storage device accessible by a CPU where the input data comprises at least a unique owner identifier and a unique manufacturer identifier and where the encoded data entry comprises a digital encoding of the input data, a means for applying the unique pattern to the goods using an ink formulation comprising one or more chemical agents detectable when exposed to a visible or non-visible frequency range of light, a means for exposing the goods with light in the visible or non-visible frequency range thereby making the pattern detectable, scanning the detectable pattern on the goods, a means for decoding the pattern to retrieve the encoded input data entry, and a means for comparing the encoded input data entry against all stored encoded input data entries in the mass storage device data to determine whether the goods are authentic.

The present invention also provides a method for authenticating consumer goods to reduce the amount of counterfeit goods including entering input data comprising at least a unique owner identifier and/or a unique manufacturer identifier into a CPU, encoding the data in a machine readable format, storing the data in a mass storage device accessible to the CPU, generating a unique pattern incorporating the encoded input data, applying the unique pattern to the goods using an ink formulation comprising one or more chemical agents detectable when exposed to a visible or non-visible frequency range of light, exposing the goods to light in the visible or non-visible frequency range thereby making the pattern detectable, scanning the detectable pattern on the goods, degenerating the pattern to retrieve the encoded input data, decoding the encoded data to retrieve the input data, and comparing the input data against all stored input in the mass storage device data to determine whether the goods are authentic.

The present invention also provides an authenticating system including a means for entering input data comprising at least a unique owner identifier and/or a unique manufacturer identifier into a CPU, a means for encoding the data in a machine readable format, a means for storing the data in a mass storage device accessible to the CPU, a means for generating a unique pattern incorporating the encoded input data, a means for applying the unique pattern to the goods using an ink formulation comprising one or more chemical agents detectable when exposed to a non-visible frequency range of light, a means for exposing the goods with light in the non-visible frequency range thereby making the pattern detectable, a means for scanning the detectable pattern on the goods, a means for degenerating the pattern to retrieve the encoded input data, a means for decoding the encoded data to retrieve the input data, and a means for comparing the input data against all stored input data in the mass storage device to determine whether the goods are authentic.

The present invention further provides a method for monitoring goods in a market including generating a unique pattern comprising an encoded input data entry stored on a mass storage device accessible by a CPU where the input data comprises one or more of a unique owner identifier, a unique manufacturer identifier, a unique plant identifier, a unique destination identifier, and time and date information and where the encoded data entry comprises a digital encoding of the input data, applying the unique pattern to the goods using an ink formulation comprising one or more chemical agents detectable when exposed to a visible or non-visible frequency range of light, exposing the goods with light in the visible or non-visible frequency range thereby making the pattern detectable, scanning the detectable pattern on the goods, degenerating the pattern to retrieve the encoded input data entry, and decoding the encoded data to retrieve the input data to confirm shipment data.

The present disclosure provides an authenticating system in which a mark, symbol, or pattern is placed on goods such as a garment. Preferably, the symbol is only detectable upon exposure to certain wavelengths of non-visible light such as UV light, IR light, microwaves, radiowaves, or other frequencies of light. However, the system may also be applied for exposure to visible light, the only requirement being that the chemical agents used to mark the goods become readily detectable upon exposure to a specified wavelength of light.

BRIEF DESCRIPTION OF THE DRAWINGS

For a more complete understanding of the present invention and the features and advantages thereof, reference is now made to the Detailed Description in conjunction with the attached Drawings, in which:

FIG. 3 shows a representative symbol placed on the cloth;

FIG. 3a shows a representative symbol placed on the cloth;

FIG. 3b shows a representative symbol placed on the cloth;

FIG. 6 is a side view of a hand held filed reader; and

FIG. 7 is a top view of a lamp employed in the hand held field reader of FIG. 6.

DETAILED DESCRIPTION OF THE PREFERRED EMBODIMENT

The system of the present invention generally comprises four components: (1) a control computer which enables the entire system; (2) a host computer located at a specified central location; (3) a printing system; and (4) a portable field reader. The components communicate so that one or all components can be located at sites far removed from one another. For example, a host computer will generally be located at one site and remote printing systems will be located at other sites. The components communicate with one another so that the control computer enables the entire system, the host computer controls and monitors the activities of the printing systems, and the reading system scans the marks and relates the scanned information to the host computer to validate the encoded marks at remote field observation sites. The printing system also reports its printing activities to the host computer at predetermined times and intervals.

Figure 1:
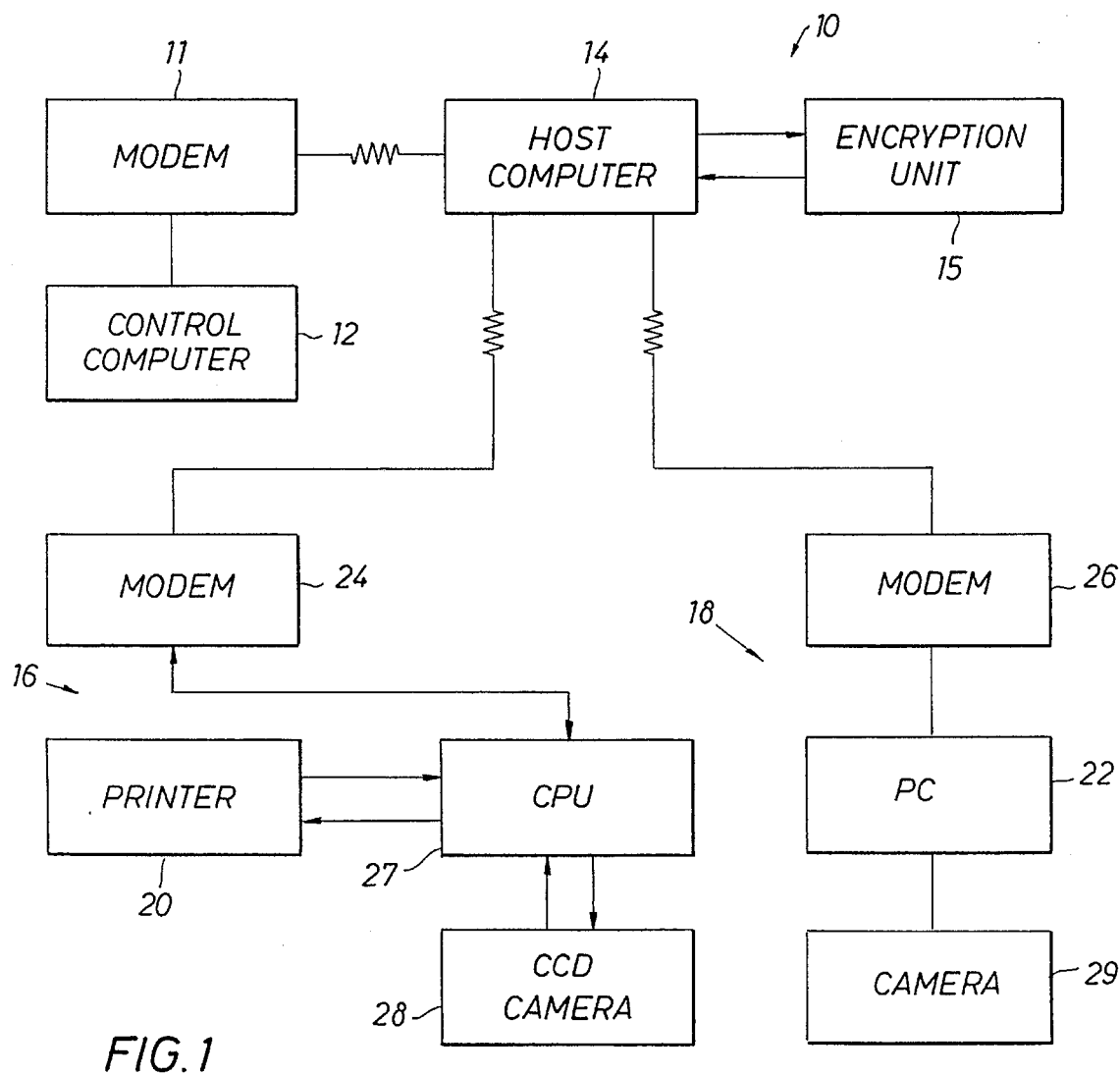
FIG. 1 is a schematic block diagram showing a system which both marks material with encoded patterns or symbols, stores the patterns or symbols in machine readable format for easy recall and comparison, and inspects garments in accordance with the teachings of the present disclosure.

FIG. 1 provides a schematic diagram that represents the system of the present invention. In FIG. 1, the numeral 10 generally identifies the authenticating, anti-counterfeiting, anti-diversion system for marking and tracking goods. The system comprises a control computer 12, a host computer 14, a printing or marking system 16, and a reading system 18. The host computer 14 stores the specific, selected information conveyed by the mark or symbol and directs the marking system 16 to imprint the mark or symbol on the material or goods and also receives and processes information from the reading system 18. The host computer 14 is connected via modem to coordinate, receive, and respond to commands sent and received from the control computer 12, a printer terminal or processing unit (CPU) 27, and a reading terminal 22, preferably a personal computer.

In operation, the control computer 12 contacts the host computer 14 and enables a specific number of imprints, i.e., 100,000. The host computer establishes an appropriate identifying message using clear text. The host computer 14 interfaces with an encryption unit 15 which converts the clear text message into an ID matrix symbol. The host computer then downloads the digital symbol to the CPU 27 controlling the printer 20. The host also establishes printer start/stop serialized numbers and specific times the printer can be in operation, i.e., 0800–1600, Monday through Friday. Once the print cycle begins, a CCD camera 28 mounted downstream from the printer in the printing process maintains a continuous validation that an appropriate symbol is being printed onto the product. If the printed symbol is different from that provided by the CPU 27, an error signal is activated to alert the operator. At the conclusion of the printing cycle, the printer CPU uploads a print count to the host.

From this point forward, marked products can be identified and verified through the use of the field reader system 18. The products are identified and verified by using a light of appropriate wavelength to illuminate the symbol on the products. The illuminated symbol is captured by the camera 29. The captured image is then transferred to the portable PC 22 where the data is enhanced (if necessary), compressed, and transmitted via a modem 26, cellular link, or satellite communication to the host computer 14.

The host computer 14 receives the data from the field reader, and interfaces with the encryption unit 15 where the message is decoded and converted to clear text. The host computer then searches the database to validate the identifying message. Once validated, the host computer sends a message back to the field reader 18 which displays the decoded message and any other pertinent information pertaining to this specific product, i.e., place, time of manufacture, or destination. If the marked product is counterfeit, an invalid signal is transmitted and displayed on the field reader computer screen at the PC 22.

To further enhance security, all transmissions between the control computer, host computer, printer CPU, and field readers are conducted through enigma cards placed in each computer at the time of manufacture and initialized when the network is activated.

The control computer 12 provides an allotment of prints to the host computer 14. This communication is carried out via corresponding enigma cards which are located in the respective computers. The enigma cards will be discussed in detail below. Once the host computer has received an allotment of prints, it enables the printing systems to imprint marks on the articles or goods as specified. The host computer is limited in its ability to enable the printing systems to impart marks to the extent that the control computer has provided to the host the requisite number of prints to cover the directions sent to the printing systems. The host computer interfaces with the encryption unit to generate a data matrix symbology which represents specified information that the manufacturer selects represented by the mark or symbol. Generally, selected specific information, which represents the mark or symbol, is entered into the host terminal 14. The encoded mark or symbol is sent via a modem 24 to a manufacturing site where the encoded mark or symbol is received by the printer terminal 27 and is printed onto material or goods at this remote marking location. This matrix is downloaded to the selected printing system for use by the printer 20 in printing the goods.

Following the placement of the print by the printer 21, a verification of the printed mark is conducted by the camera 29 which compares the mark as printed with the mark directed by the printer PC. As a result of this marking, the goods can be scanned by a field reader 18 to determine the presence of authentic marks. Once the reader has captured the data from the scanned mark, communication is established by the reader with the host computer 14. The host computer 14 compares the scanned mark with marks entered in its database to determine the authenticity of the mark or to track the goods.

An added feature of the present invention is the real-time nature of validation. Piracy, counterfeiting, and/or diversion commonly occur at the factory or just beyond its gates. The present system allows the functionality of immediate interception on the yard, or the backdoor of the plant. A field reader may be used for inspection at the plant gate to verify that goods going out of the plant gates are authentic, marked, and correctly routed. The creation and printing of marks is real-time. The printer PC on the ground reports back to the host computer and therefore all the markings that have been prepared for the day's operation will be in the archives or in the records of the host computer 14. Immediately after the goods are marked, they can be inspected and a reading determines the (in)validity of the mark through the host computer 14.

The only lag time is that which is required to transmit from a field reader to the host then back to the field reader to obtain validation. The field reader remains connected while the host computer decodes and checks the data host for the scanned mark. The reader receives validation while the goods are under the custody and control of the reader operator.

Two pricing accounting/security systems are also provided within the system. First, the control computer enables the host by providing an allotment of prints and tracks the number of prints allotted to the host computer. Second, the host computer allots a prescribed number of prints to the printer and thereby enables the printer to print marks on the goods or materials. In addition, the host tracks the activity of the printers and counts the prints made at the printing locations.

The present invention ensures that authentic goods are routed to the correct destination and counterfeits lacking the identifying marks are located. In the case of many products or goods like handbags, trading cards, works of art, or any other article where authenticity adds to the value of the item, the system can be used to guarantee authenticity. A certificate of authenticity can be provided to customers at the time a customer purchases the goods. Not only is the pocket book marked, but the customer also may receive a guarantee from the manufacturer/designer and the local department store that the good has been confirmed as authentic prior to sale. The customer buys the bag and can see the salesman check the authenticity of the item in the computer system.

The system and method of the present invention is also particularly well tailored for use by customs agencies and clearing houses around the world for quick and easy inspection of goods entering a country, thus facilitating detection of counterfeit and misdirected articles. For example, such information may include information relating to the domestic representative in a foreign destination for the goods.

The central or control computer communicates with the host computer to provide the host computer with an allotment of imprints. The enigma card enables a secure communication to be established between the control computer and the host computer and between the host computer and the printer. The central or control computer can access the host's network to re-enable the host computer with another allocation of imprints. Once the host expends its allotment of imprints, the whole system shuts down. The host must then call the central computer and be re-enabled through the acquisition of an additional allotment of imprints. In a similar way, the host computer can access each printer under its control to re-enable the printer with another allocation of imprints. Once the printer expends its allotment of imprints, the whole system shuts down. The printer must then be re-enabled through the acquisition of an additional allotment of imprints from the host.

The enigma card has its own microcontroller, random access memory (RAM), and storage capability. It, also has its own program so when the host establishes a connection with the printer location, the host is actually communicating directly through the enigma card. The enigma is constructed to be tamper proof.

The enigma card microcontroller is programmed to manage its own onboard memory. Any writing to the memory is managed by the on-board microcontroller and that on-board microcontroller talks to the PC and the PC talks to the host through the modem.

The enigma card has an on-board security bit that can be set to protect internally programmed software codes and security codes. It is commercially available, having custom software codes and security codes that are not readily readable. The host actually has the same enigma card as the printers located at the manufacturing site. The computer at the printer location, however, may have limited software that limits its ability to use the enigma card.

When the host contacts the CPU 27 at the printer location, the first step is to establish a coded communication. Once the protocol for the coded communication is set, the printer location enigma card continually monitors either every print or some block of prints created and imprinted at the printer location. The printer location enigma card tracks the number of prints against the allotment from the host computer. When the enigma card detects that the allocation of prints for the specified period of time has been exhausted by the printer, then the printer location enigma card immediately prevents additional printing. The printer can no longer operate without authorization from the host computer enigma card to the printer location enigma card.

Printing information at the end of a manufacturing run is transmitted to the host computer via the respective enigma cards before the line is disconnected. This information may include the quality of printing by the printer and the quantity allocated but unused by the printer. At any given time, the host computer can also interrogate a printer and gather this information. This can be done on a random or a spot check basis.

The control computer periodically updates its own database to reflect the number of imprints allowed by the host computer and printed by the printing system. The control computer serves an internal audit function which tracks the uses of various host computer systems. The control computer downloads an allotment of imprints to the respective host computers. These imprints are then held in the memory of the host computer. The host can only enable printing systems to print the number of prints allotted to its bank. Once this allotment has been depleted, the host computer must once again be enabled by the central or control computer through a replenishment of its internal bank of prints.

The host computer controls the printing process by enabling the controller (CPU) 27 at the printing location and determining the number of imprints which will be used by the printing system for a particular day, week, month, etc. The host dictates to the printing PC the number of available prints/marks for a particular run. The host, located usually at the headquarters of a company, controls the manufacturing facility by allocating and tracking the number of goods which will be printed. The controller at the printing location will not know what symbol is being printed nor what code is being printed that day. The printer controller has no way of changing the code that is supplied to it by the host computer. In addition, the controller may be prevented from reading the code as supplied to it by the host computer.

The system is able to allow the host computer to change the code at any time, even during a manufacturing run. The host computer can also interrupt a cycle at any time and change the code. If the host controller believes that the code has been compromised in some fashion, the code can be changed entirely and the operator at the print location need not be notified of the change. Code changes may be implemented after allotment to the remote printer location when warning flags indicate that the security systems, including the enigma cards, have been compromised or may be done on a random basis. This is possible because the two computers are in communication during the print run, and the printer operator is unaware of the symbology being printed. The code is preferably changed on a random basis.

The input data, encoded entries, and marks are kept as a confidential collection of data at the headquarters of the manufacturing firm in the host computer. Using this approach, specific information can be logged which facilitates tracking the flow of goods and possible identification of counterfeit goods, i.e., goods not marked or not marked properly.

The encryption method is encoded on a microcontroller, using, preferably, a table encryption method. The printer location requires that its enigma card establish a coded communication with the host computer. Once the communication has been established between the enigma cards, then various program files are executed. The host computer then determines how many prints have been used by the printer, enables more prints if needed, removes prints if required, and enables printing for a specified time period.

The enigma card plays a role in providing a starting and an ending accounting number. Any communication with the printer is in a coded format which requires the enigma card to instruct the printer how to make these prints and how many to make.

In the preferred embodiment, a digit code is downloaded to the printer location after the security protocol is established between the host computer and the printer location on the computer enigma card. As soon as verification that a secure transmission link has been established, a coded transmission is then exchanged from the host to the remote printer location.

The conversion of the identifying information into the matrix is accomplished through the use of a computer program. As an example, I.D. Matrix located in Clear Water, Fla. provides a patented system for encrypting information and enabling conversion of an alpha/numeric code into the symbology format of the present invention.

Following the creation of the data matrix symbology, the host computer downloads the matrix symbology digitally across a modem, the Internet, or other communication means to the remote printer location. Once the symbology has been encrypted, a pictorial representation of this encrypted message comes up on the computer screen at the host computer for verification and appears as a checkerboard of black and white squares. At that point, the matrix symbology is downloaded to any remote printer location via the enigma cards. At the time downloading occurs, a proprietary system loaded on each enigma card scrambles the digital data to prevent interception of this message. An encryption card is loaded in the host computer's enigma card and a matching encryption card is loaded in the enigma card located at the remote printer location. The transmitted message is then reassembled at the printer location through the encryption chip at the printer location. Once the basic symbology is downloaded, the printer location computer is able to serialize the marks (i.e., 00001, 00002, etc.). This numbering system is an inventory control system as well as a security system because the host computer allocates a number of imprints to the printing system for a particular day, week, month, etc.

As an example, the first garment receives the number ABCDE 00001. The second garment receives the number ABCDE 00002 and so on through the printing cycle. Each character represents particular information which is stored in the host computer. This serialized marking with selected manufacturing data is printed in the I.D. Matrix format. The marking information is sent back to the host computer with the total inventory number once the manufacturing run has been completed or as the host directs the printer location. In the preferred embodiment, the security code is a ten character code comprised of five alphabetic and five numeric characters.

The printer location computer can request an allotment from the host computer, which number is either automatically allocated by the host computer or is specifically requested from the printer location. At this point, the printer location is not generating the code, but merely requesting authorization from the host computer. The host computer allocates to the printer a quantity of prints. Depending on the degree of control that the host computer requires, it can allocate for one day, one shift, one week, one month, or a whole year. The host-to-printer allocation method is thereby flexible enough to adapt to the needs of the particular type of manufacturing operation.

The host computer maintains a record of the number of prints used by a particular printing system. This accounting occurs through the enigma card. The enigma card protects and controls how many copies are made and how many prints are made. The printing system updates the host computer on a periodic basis with respect to the number of prints used during a specified cycle or run. This transfer of information can be programmed to occur on a random basis or at selected predetermined intervals. For example, if the printer is allotted 5000 imprints, but only 4,337 are used at the end of the day, the printer location computer will report back to the host computer that only 4,337 imprints were made. The system, thereby, functions as an inventory control system as well as a security system. This is particularly useful in the context of system licensees. This feature facilitates license agreements on a batch unit basis and keeps strict control over licensees for royalty purposes.

The mark, pattern, or symbol which is applied to the material can be as simple as a logo or brand identifier, but in the preferred form of the present disclosure, the mark, pattern, or symbol includes the encoded data and is typically requested in a symbology format such as the I.D. Matrix format. The data can be quite substantial, including such information as the lot number, a manufacturer identification number, the particular market destination (i.e., the country or state), a product identifier, a company identifier, and time, date, and place of manufacture. The mark can also include data representative of the particular factory in which the goods are manufactured and any other information which is represented alphabetically, alphanumerically, graphically, or the like and can be associated with the goods. All such information, i.e., input data, encoded entries, and the marks, are stored in mass storage devices for later use in goods verification/authentication, tracking, and/or counterfeit detection.

As an example, if it is known in advance where the goods will be assembled, i.e., the material is to be shipped to a particular factory for scheduled use, then the time, date and location of the factory are known as well as the goods to be made out of the material. Under such conditions, the mark applied to the material can contain this information along with a goods identifier and manufacturer identifier. Using blue jeans as a specific example, one can mark bolt of cloth with a mark, symbol, or pattern not readily seen on visual inspection. The mark can include chemical agents that are not visible until they are exposed to certain frequencies or wavelengths of visible or non-visible light which render them readable. Such chemical agents can include ultraviolet (UV) or infrared (IR) sensitive dyes. For convenience, the cloth can be marked on the backside. Moreover, if the marking is located on the cloth which is cut into the leg, then the marking can be viewed when the garment leg is turned inside out and placed under the appropriate light to enable inspection.

In the preferred embodiment, the symbology is printed using invisible ink so that the operator will have no way of knowing whether a valid symbol has been printed. A reader, however, is located down the line and scans the marked articles, illuminates the mark and verifies the data matrix indicating that it is indeed a readable mark. The hardware and the software on the ground at the printer determine the number of valid marks imprinted on a particular run of goods.

The marks and symbols are comprised of encoded information represented by an alpha/numeric code. As an example, a ten character alpha/numeric code is entered at the host computer. Five characters would be alpha and five characters would be numerical, i.e., ABCDE 00001. The marking system could be reversed so that the numerical side may be used for the purpose of providing such information as plant, lot number, customer number, account number, etc., while the alpha symbols may reflect a sequential accounting. Once the code is selected and entered, it is encrypted into the form of a data matrix which resembles a crossword puzzle or a checker board. Selected encoded information is distributed at random within this matrix. Typically, the symbology will consist of nothing more than black and white squares once exposed to UV or IR light. ABCDE 00001 is converted into a distinctive checker board data matrix symbology. As items are imprinted, the code changes. Using the example from above, the number increases to ABCDE 00002 and a second checker board data matrix symbology is created and imprinted on the second item. The second symbol does not resemble the first one, other than the fact that it consists of black and white squares.

The printing operation can be either operator initiated or clock initiated. The printer itself has a computer in it and is controlled by the enigma card and the modem link. In response to the enigma card and modem link, the printer location computer controls the print heads that actually print this I.D. matrix. The printer also has the software to generate the I.D. matrix from the data provided by the host.

A garment machine or other suitable transporting system, i.e. a conveyor, moves the fabric or the goods themselves underneath the print heads at a predetermined speed so that the print heads can imprint the encrypted code that has been established at the host computer on the fabric or goods.

The garment print machine comprises a closed loop system that monitors the imprinted material as it comes through the line. A detector examines the imprints and detects whether a valid imprint has been made. The detection step is performed using a camera. If a printing error occurs for whatever reason, e.g., the ink runs out or a misprint occurs, a signal or a beacon may be activated to allow the local operator to make a command decision as to whether to continue to print, continue his production without printing, or to stop the process and troubleshoot the problem. The software package counts valid prints and stores this number for transmission to the host computer. Ultimately, these valid prints are debited from the host computer bank. The on-line verification reader is typically located six to eight inches down the manufacturing line from the printer. The verification reader reports to the printer location computer, which reports to the host computer at the end of the day or other specified period. If misreads or misprints occur or the full allocation for the day is not exhausted, the host computer is informed at the end of the day or other period.

Any physical process to which the goods must be exposed preferably occurs before the marking cycle. Preferably, printing of the symbology is the last step in the manufacturing process before the goods enter the stream of commerce. The last inspection for quality control measures preferably occurs prior to the time the goods are printed so that defective goods are eliminated prior to the time they are imprinted. This becomes necessary to insure that the printed symbol is not erased or destroyed through any physical process, i.e., stone washing, acid washing, etc. in the case of jeans. Otherwise, the symbols imprinted on the goods or articles prior to stone washing or acid washing may not survive the hostile environment and may be lost.

The print location controller enters a user I.D. and input data detailing destination, shipping instructions, etc. to the host computer through the enigma cards. The confirmed request or order is transmitted to the printer location computer in encrypted code format by the host PC.

In the case of apparel, the present authenticating system has the advantage that permanent marks are not required, i.e., the marking formulations can be water soluble or soluble in a variety of organic solvents. The general chemical family is classified as derivatives of stilbene fluorescent compounds with emissions in the range of 450 NM when exposed to UV radiation. Thus, for goods that are normally not washed before retail sale, such as jeans, the present disclosure sets forth a system in which temporary markings are placed on the goods. However, the compounds exhibit at least some permanence when used on some products, i.e., leather.

The marks, symbols, or patterns used in the present invention can also be made permanent through the use of permanent chemical agents. Permanent markings can be especially useful with goods that are not typically washed or with goods where accurate product tracking data is highly desirable. As an example, handbags are typically not washed and may have a life in the possession of a consumer of several years. Thus, it may be important to know the source of those handbags even years after the original sale to investigate after market information or product demographics. Even when a handbag is several years old, it can be checked using the present invention to determine the manufacturing lot number and other data contained in symbols which were placed on the handbag during manufacture.

The marks, symbols, or patterns suitable for use in the present invention can include, without limitation, codes such as UPC symbols, data matrix symbols, graphic symbols such as logos, pictures, images, and the like, encrypted data in textual, numeric, binary, octal, hexadecimal, alphanumeric, or the like, or any other data encoding format. Additionally, it is possible to apply the mark repetitively to the goods or to the material out of which the goods are made. For instance, in the manufacture of garments, the cloth can be periodically marked during manufacture, i.e., before it is rolled into the bolt. Alternatively, the cloth can be marked when unrolled from the bolt. In the latter instance, marking can occur either before or after the cloth is cut.

Figure 2:
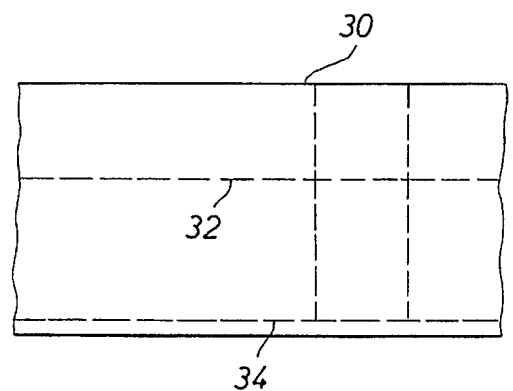
FIG. 2 shows a portion of material and a location for applying the encoded patterns or symbols.

The cloth is marked in a suitable pattern as shown in FIG. 2. After marking, the cloth is then converted into a particular garment and in this instance, it is converted into a pair of trousers. As the raw material is used in the manufacturing process, the symbols which are placed on the cloth become a part of the garment. FIG. 2 shows a segment of the cloth 30 showing the back face, or unexposed face, of the cloth. The dotted lines at 32 and 34 represent the paths along which the markings are placed. It is well known in advance of manufacturing where the lines 32 and 34 will be located in the finished garment. For instance, they can be located in the waist band or perhaps in the leg. The markings are preferably located in the finished garment so that the two lines 32 and 34 assure that the repetitive manufacturing process locates the symbols at the desired locations. For purposes of the present disclosure, assume that the markings along the lines 32 and 34 are located in the leg and are approximately two inches above the hemmed cuff and approximately 18 inches above the cuff in the completed pair of trousers. Trousers are finished with the markings along the lines 32 and 34. Two sets of markings are applied through the use of two duplicate ink jet printers. Indeed, four or five duplicate ink jet printers can be used in parallel to provide even more markings on the back face of the bulk cloth. The markings are applied repetitively along the cloth in bulk and are therefore incorporated in the finished goods.

Moreover, a repeating mark, symbol, or pattern can be marked along the bolt cloth repetitively at any distance from the edge. It might be appropriate to place the markings along the center of the cloth or distribute the marks across the entire surface. Where a repeating pattern is applied, information sufficient to identify the goods can be encoded into the mark such as in the fashion of a UPC code with the same mark simply being repeated along the length of the cloth for each lot.

By way of example, representative symbols are shown in FIGS. 3, 3a, and 3b of the drawings. Without regard to the meaning of the symbol shown in FIGS. 3, 3a, and 3b, it is readily understood that the symbols encode a set of data which enables unique identification of a lot of goods and date of manufacture of these goods. Moreover, the set of symbols shown are particularly useful because the location of the encoded data is not specifically known. For instance, protection against counterfeiting of the numbers can be implemented. As one example, every symbol in the data indicated by the numeral 56 (shown in FIG. 3b) can be generated by a random number generator and have absolutely no significance. By contrast, symbols in the region at 58 (shown in FIG. 3b) can have significance when decoded. This can be used to enhance the security of the encoded symbol on the bulk cloth. An alternate embodiment is the bar code which is used for UPC identification. While that particular code need not be used, it is acceptable in terms of format.

One preferred procedure for applying the marks to the goods uses a typical ink jet printer which directs a spray of a chemical formulation onto the goods. The chemical formulation can be an ink or similar composition that can be applied in a predetermined pattern to the goods. As applied, it is formed into a specific pattern representing either encoded data or raw data. The pattern can be in accordance with the UPC symbols or the like.

In another aspect of the present invention, the marks are applied to the cloth in bulk. The ink jet printer applies a dye along with a volatile solvent which evaporates, leaving the markings on the cloth. In the preferred embodiment, the ink used is a proprietary product of Trident, Inc., Bloomfield, Conn. identified as FL-61. Preferably, the markings are of the sort which are not readily visible to the eye, but are readily seen or detected upon exposure to non-visible light sources such as on exposure to UV or IR light which causes the mark to become illuminated or visible to the eye. Of course, the exposure need not make the mark visible to the eye. All that is required is that the mark become detectable in some fashion so that the system can discern the mark, decipher or decode the mark and verify the authenticity of the mark. If desired, a permanent dye can be used.

The anti-counterfeiting system of the present invention contemplates marking raw materials or intermediate products to be incorporated into articles of manufacture or other goods with a symbol or pattern which conveys authenticating information, storing this information in machine readable format in a computer database, and using a field reader to identify authentic and counterfeit articles or goods.

The marking aspect of the system of FIG. 1 includes a remote modem which communicates with a host computer and a printer for imparting the patterns or symbols on the material. Preferably, marking occurs at the stage at which the product(s) is manufactured. In an alternative embodiment, it can also be used with unmarked bulk cloth in bolt form at the time of manufacture. In like fashion, the system of FIG. 1 can be used to mark leather or plastic, e.g., waterproof sheet plastic, woven nylon cloth, etc. In that instance, the cloth is spooled into a bolt, shipped to the factory, and then unspooled as the cloth is used in fabrication. At that stage, the cloth can also be marked. Without regard to the point in time, the cloth is marked with a set of symbols.

Attention is now directed to the marking system of FIG. 1 which will be described in detail. The system/host computer protocol operates as follows. The printer system 16 waits for the host computer to call and download the start/stop print sequence codes for the specific print cycle. Print data is stored in memory on the enigma card. The ink jet printer is positioned at the requisite location to direct an ink jet onto the product. The ink jet printer preferably applies an ink which is formed of two components, a dye and a solvent or carrier. The solvent is volatile and evaporates so that the dye is left on the cloth. In this particular instance, the preferred dye is one which is not visible when impregnated into the cloth. In a preferred embodiment, no marking is seen in ordinary light by the unaided eye. Rather, the marking is visible when irradiated with a special wavelength of light as described. At the end of a print cycle, the printing system calls the host computer to upload the total print count for that cycle.

In a preferred embodiment, the marking system is comprised of an enclosed single 296 orifice/32 channel print head mounted at 90° to the path of the product or Dual 96 orifice/32 channel print head mounted at 27 degrees to the path of the product. The print heads are mounted on a swivel bracket assembly with a detent home position. The print heads are controlled by the print location computer, which accepts data for generating printed images from the host computer via modem. The print location computer will typically be a personal computer. The data can be ASCII or graphic images. The print head(s) alignment is suitable for applications needing 64 bits of vertical resolution. The software is designed to print graphics images that are 64 dots vertical and 16 dots horizontal. By utilizing the printer bolderization parameters, the horizontal resolution can be extended to any integer multiple from 1 to 10.

Figure 4B:
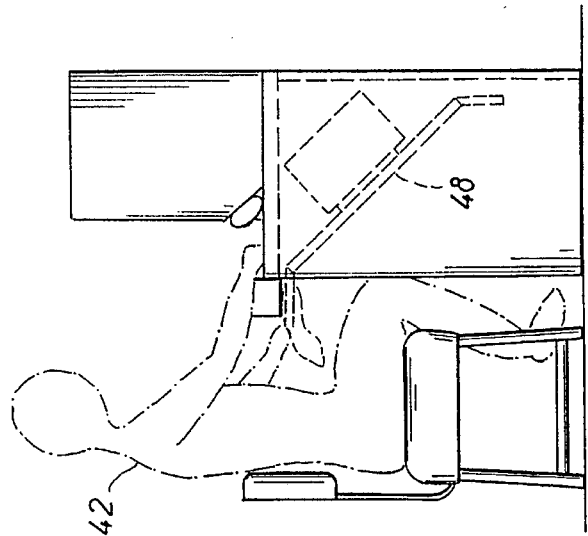
FIG. 4b is a side view of a garment marking machine in accordance with the teachings of the present disclosure.
Figure 5:
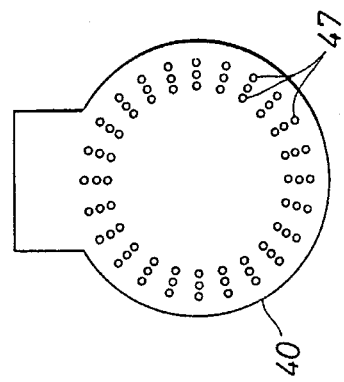
FIG. 5 is a top view of a garment carrier detailing the vacuum ports.
Figure 4A:
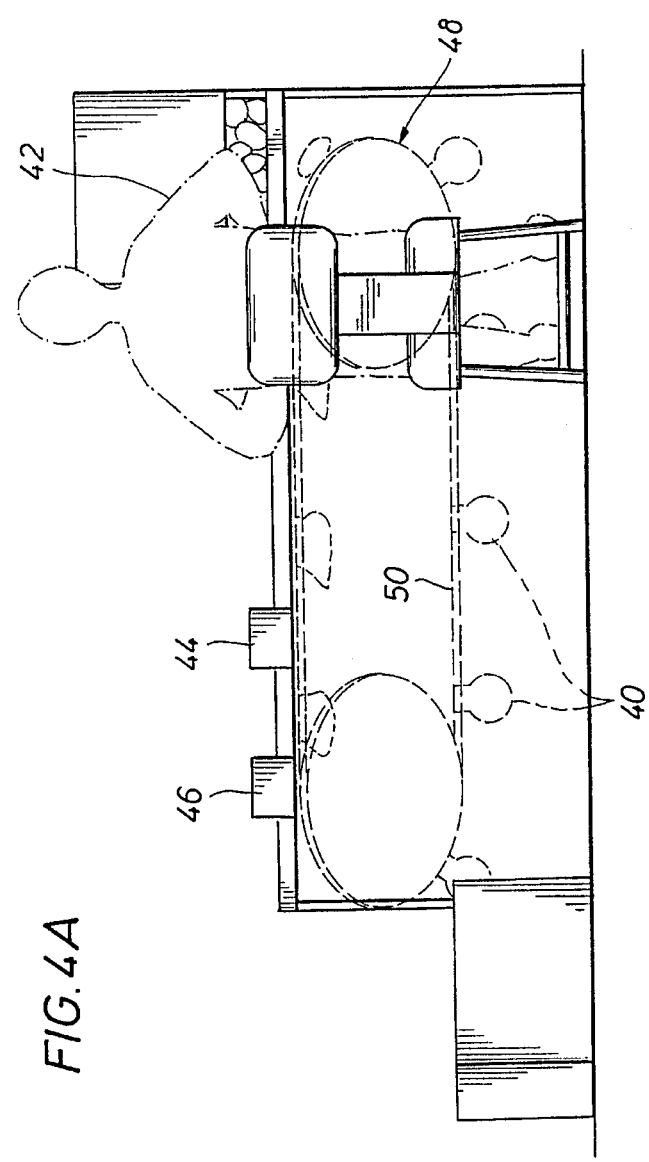
FIG. 4a is a back view of a garment marking machine in accordance with the teachings of the present disclosure.
Figure 4C:
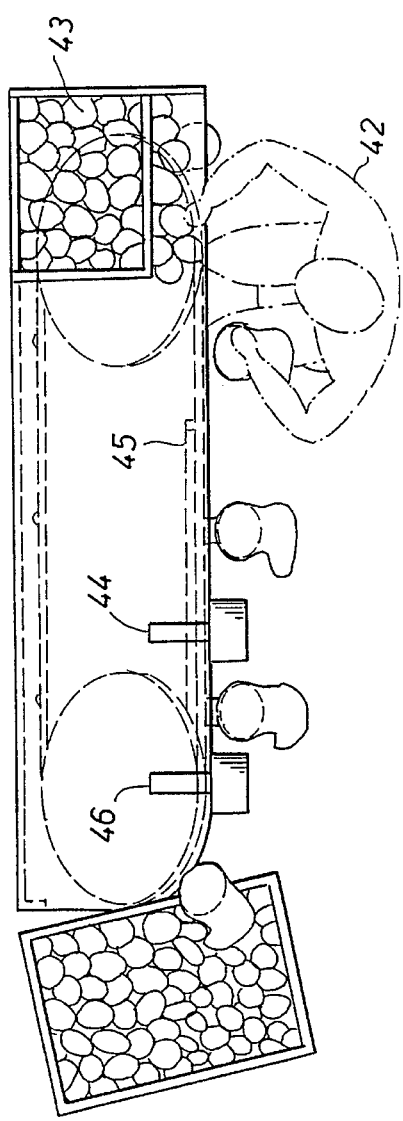
FIG. 4c is a top view of a garment marking machine in accordance with the teachings of the present disclosure.

The goods or materials are positioned for marking on a conveyor station as shown in FIGS. 4a–4c. The conveyor station moves garment carrier pads 40 (shown in detail in FIG. 5) in front of an operator 42 who positions the "to-be-marked" section of goods to be marked 43 on each pad 40 as the appropriate section passes by the operator 42. The to-be-marked section is smoothed and held by air-suction provided by engaging a carrier suction actuator 45 through the vacuum ports 47 on the pads 40 while it is being transported from the operator 42 to and under an ink-jet printer head 44 and optical print verification detector 46. The suction is then removed, and the marked garment is released.

A narrow electric-motor driven belt with multiple carrier pads 40 attached at spaced intervals circulates around an elongated oval track powered by a transport drive 48. In a preferred embodiment, ten carrier pads 40 are spaced at eighteen inch intervals. A straight section of the track in front of the operator 42 exposes the pads 40 for loading and connects the pads 40 to a vacuum system that provides the suction. At the far end of the straight track, beyond the print-head location, the vacuum connection is broken and the belt and pads curve around a drive-pulley under protective cover to begin their return to the loading operator 42.

A horizontal motor-driven conveyor belt 50 parallels the straight section of track along a line just below the carrier pad 40 to support and move bulky goods or garments while their to-be-marked sections are on the carrier pads 40. The speed of the carrier pads 40 and the conveyor belt are perfectly synchronized so that the to-be-marked sections remain fixed on the pads until ink marking and checking are complete. The synchronized speeds are infinitely programmable over a range from nine to ninety (9 to 90) feet per minute. Garments can be loaded and marked at rates from six to sixty (6 to 60) per minute, depending on item complexity and operator skills.

Once the goods or materials have been marked, the goods or materials can enter the stream of commerce. Goods can be inspected at remote locations to determine whether the goods are authentic, i.e. whether the goods have an authentic mark or symbol which can be confirmed. In addition, specific information provided by the mark or symbol can aid in the tracking of authentic goods. Finally, counterfeit goods can be detected by the absence of any authentic mark or symbol.

Thus far the disclosure has been directed to anti-counterfeiting. Another major problem associated with the manufacturing operation and the flow of goods is called diversion. As an example, goods made in Mexico City may be destined for Frankfort, Germany to a German distributor with the stipulation that they are only to be sold in Germany. However, the distributor seeking to make a greater profit may sell the goods into the former Yugoslavia, Czechoslovakia or Poland at a greatly inflated price. These sales are against the interest of the manufacturer because the national distributors in the areas where these goods are diverted may not be able to compete or lose the value of their distributorship. The system of the present disclosure is useful to prevent diversion.

The printer operator may provide the host computer with detailed shipping information so that the host computer can modify the code to include this information. The print controller may have the functionality to provide information to the host computer or the host computer controller may enter this information so that the information would be associated with the marks or symbols printed on the goods destined for a particular region of the world or market.

The print controller may be able to associate a particular run of goods with a purchase order. Where this is feasible, the goods become associated with a piece of commercial paper, thus facilitating enforcement of legal rights by providing supporting documentation. The preferable mode of operation is to utilize the system on a daily basis or the shortest period of time that is practical to enable control over the printing system and to accommodate changes in the code to reflect destination information.

The only information that the print controller will have at its disposal is a warning, i.e., low ink, low temperature on the print head, high temperature on the print head or some sort of malfunction and a screen which instructs him on how to troubleshoot the problem. If an emergency shutdown of the line occurs, a system lockout results and a supervisor must insert a key to restart the whole system again. This serves as a physical security measure.

The host computer or printer can be informed of a run change so that the symbology can also be changed. This can be done on a real-time basis.

The time, the date, the type of product, the count, the location of manufacturing, the ordering customers, the user ID and password of the supervisor or printer operator, the individual user ID and password of the authorized person or persons, and any routing customer information typically is represented by the symbology. Regardless of whether the code is random, sequential, or logically created in terms of the ten character preferred embodiment scheme, this information needs to be associated with the symbology.

The printer location computer will also interface with an optical reader 46 to verify product marking. The optical reader scans the marked products and cross references the scanned information with the encoded data. This procedure insures that the printed marks or symbols are properly placed on the goods or materials and allows confirmation that the appropriate marks or symbols were placed on the appropriate goods or materials.

After the garment has received its marking from the printer, the garment is scanned by a reader to confirm a valid marking. A camera is positioned to verify that a readable print has been made and that the information conveying positions of the symbols are readable.

The camera is preferably a charge couple device (CCD) camera. It is a black and white television camera with a solid state image center. However, any detection means capable of capturing the image is envisioned by the present disclosure.

The CCD camera illuminates the mark with UV or IR light and the CCD camera will capture the UV or IR illuminated image. The captured information will be fed to the computer which will verify that the expected print actually was printed. Either a match is obtained or not. If no match is obtained, the printer computer indicates a problem with the printer to the printer controller and to the host computer.

A plugged nozzle in the print head can affect print quality adversely and prevent the field reader from capturing the image so that it can subsequently be decoded. This cross referencing system allows early detection of printing problems before too many marks are printed that are unreadable.

The printing system operates generally as follows.

An I.D. matrix is generated. The printer PC instructs the print head to print the matrix. The matrix will be saved and compared to the captured and processed image from the CCD camera and compare the scanned mark with the mark generated by and stored in the database to determine the existence of a match. If a match is not made, a bad print reading signal is received at the printer PC. In this manner, the printer operator is informed of a potential problem.

With the I.D. matrix, redundancy is built into the matrix system so that it is possible that even a poor quality print can still be readable.

The validation occurs through the printer location computer and not through the enigma card located thereon. The matrix originates through communication between the host computer and printer location enigma cards, but once created the matrix itself is stored in the printer location computer. Prints can be debited or accounted for after verification if so desired.

The fourth component of the system is the field reader. The field reader is preferably a hand held device housed in a briefcase or the like. The briefcase typically comprises a power pack battery source, a laptop computer, and a hand held reader that is connected to the laptop computer.

FIG. 6 shows a side view of a hand held reader. The hand held reader 90 has a handle 92, a CCD camera 94, a light source 96, an electronics module 98, a narrow band-pass filter 101, and a cord 100 for connection to the central processing unit. FIG. 7 shows the circular configuration of the light source 96.

The means for detecting or reading the activated mark can be a bar graph reader such as is used to read the universal product code symbols (UPC hereinafter) in the case where the mark is a bar graph or any other type of reader used in conjunction with other arbitrary marks, symbols, or patterns. Preferably, a data block can be printed on the goods or materials used to make the goods, such as bolt cloth, where the data block includes light and dark areas (treated and untreated areas) in a given arrangement that can be read and converted into an encoded data entry or raw input data.

For reading, the encoded marks are read by illumination with the required IR or UV lamp. Once obtained, the symbols are compared by manually comparing the marks or by using an optical scanner connected to a computer whereon there is a database containing the various range of entries. Such a database will commonly be stored in a table structure utilizing commonly available database software. This database of values, commonly seen in a "look up" table, provides the appropriate codes marked onto the garment. The data base can be arranged to cross-reference and cross-validate various arrays of information that have been encoded. For example, the database, in the form of a look up table, can conveniently provide data indicative of origin. Should the markings be counterfeited, there is no basis by which the counterfeit manufacturer will know the appropriate origin data, thereby increasing the possibilities of detecting counterfeit garments. This system particularly aids in the protection of national markets and customs inspections which are made at international borders.

The camera captures the image and extracts the matrix out of that image so that it can be stored in memory along with other information provided to the field reader, such as the location of inspection, etc. However, the reader preferably does not decode the matrix. The reader has the capability to decode the matrix; however, in the preferred embodiment this function is disabled to prevent any compromise of the security of the overall system. The reader merely captures the I.D. matrix. Then, either on-line or at a later time, the field reader calls up the host and downloads the series of ones and zeros. The host has the ability to decode the I.D. matrix and determine if a valid or invalid code is present. In addition, the host can utilize all the encoded information to inform the inspector concerning tracking/diverting problems.

Upon inspection at various locations, e.g., customs inspection stations, the goods are scanned for a representative mark or symbol. Either confirmation of marking or confirmation of specific data can be determined. This may require modem 26 connection between the local reading terminal 22 and the host computer where the encoded information is secured and stored. Comparison of the mark or symbol with the stored data enables both detection and tracking of authentic goods, as well as detection of counterfeit goods lacking the necessary mark or symbol of authenticity.

In a preferred embodiment, the host computer 14 utilized in the encoding/decoding system consists of a personal computer with serial and parallel interface, VGA monitor, keyboard, an Intel 33 MHz 486 processor, a 400 meg HDD, 3.5" FDD, and 9600 baud modem. The host computer 14 is interfaced with an encoder/decoder which generates matrix codes for downloading to the marking system 16. In addition, the host computer 14 accepts data from field readers and interfaces with the encoder/decoder to authenticate the captured matrix and then returns a valid/invalid signal to the field reader.

The host computer maintains a non-volatile record of serialized encoded messages downloaded to each printing system location, maintains production run data for each remote printing system, and maintains a database for the field reading system to aid in product tracking and authentication. In a preferred embodiment, the host computer communicates with field readers via ASCII 7 bits, 1 odd parity bit, 1 stop bit and 1 start bit. This communication allows the field readers to provide data to the host computer which can be processed, thus enabling detection of authentic and counterfeit goods.

In the preferred embodiment, the markings are made visible by irradiating light from a special lamp. The lamp provides a selected wavelength of light which illuminates the mark or symbol. As an example, UV and IR light may be used to illuminate the marks utilizing UV and IR sensitive dyes as described above. An ink is selected which is compatible with a selected wavelength of light. The preferred light form is UV light which collaborates with a UV responsive dye. When irradiated, the markings are then visible to a reader.

The field reading system is used to verify valid product marking at any point in the distribution chain from the printer to the retail outlet. The portable reader consists of a video or digital camera system with selected light sources for image acquisition (i.e., UV and white light), a personal computer controller and software to capture, store, and enhance the quality of the image, and a modem for communicating with the host computer.

The host computer/field reader communication protocol is as follows. In a preferred embodiment, the field reader transmits I ASCII, 7 data bits, 1 odd parity bit, 1 stop bit, and 1 start bit. The field reader will also transmit an identification header (12 character text string), operator name (20 character text string), location, (20 character text string), and a digital image. The digital image is a 256×256 8 bit scale image transmitted in raster pattern from upper left to lower right pixels of the image.

The host computer accepts remote field reader data, interfaces with the encoder/decoder, and returns a valid/invalid message to the field reader. The host computer also provides the field reader with data listing all previous verifications of the encoded message in the form of date, time, location, operator, and valid/invalid status.

The inspecting agent can inspect different manufacturers' goods and have access to many different host computers. Within a single manufacturer, however, their symbology is proprietary. A manufacturer would not, for instance, even with identical equipment, be able to read another manufacturer's code. Each network has proprietary symbology developed specifically for that client.

Customs inspection points can also use the reader system by capturing the image and pressing a button to indicate a certain manufacturer. As a practical matter, inspection occurs through the use of private inspectors and with customs personnel. The manufacturer actually pays for a campaign, i.e., a cycle or a 3 to 6 month campaign, depending on how extensive an inspection the manufacturer desires. The invention places into the hands of the customs agents and/or paid manufacturer field representatives a foolproof method of capturing the encoded images on goods and verifying that the goods are indeed legitimate or properly routed without expensive or extensive training. An added advantage of this system is the implementation of a system that avoids all the paperwork that the customs people would ordinarily require in inspections and making inspections more readily accessible.

The system does not require that the inspection agent operating the reader system even focus the camera. All that is required is that the reader system be turned on. The reader system is packaged in a briefcase and is typically comprised of a laptop computer, a battery pack and the hand held reader. The hand held reader may be attached by an umbilical cord or may operate independently of an umbilical cord. In addition, the reader may read a certain number of garments, capture the information and subsequently be plugged into the laptop computer to download the information from the hand held reader to the laptop.

Another possible option uses a radio frequency transmission from the hand held reader back to the laptop. Regardless of the available technology, i.e., umbilical cord, radio frequency, or satellite, the information is captured and then downloaded. The information typically is going from an analog to a digital signal and into the laptop computer. An automatic dial up modem connects the laptop to the manufacturer's host computer. The host searches its archives for the captured information. The encryption unit decodes it and a signal is sent back to the laptop creating a display on the laptop screen which indicates whether the product is valid or invalid. Also, information relating to previous inspection time, dates, and places can be placed on the screen. In other words, the goods can be traced anywhere along the distribution chain where those goods have been read or that shipment has been read and this information is archived in the host computer.

Once the image has been illuminated by the hand held reader, that image is captured and transferred to the laptop. An additional software package within the laptop enhances the image. The image is cleaned up in the laptop prior to transmission. If some fuzziness is present or the contrast is poor, the software package cleans up that image, in a manner known in the art, prior to transmitting back to the host computer so that poor quality data is not transmitted. Once the mark has been verified as authentic, the inspector moves on to his next assignment. This inspection can be done in a department store or at any place along the distribution chain i.e., customs or trucking terminals, flea markets, department stores, etc.

Each laptop or hand held reader is preprogrammed to recognize the user. When a user logs on, it identifies nomenclature chosen to establish communication with the appropriate computer. To gain access to the host computer, the field inspector must properly identify himself. This may include a password in addition to his name. There will be a reader I.D. and an inspector I.D. The field inspector will be asked to enter his location, and then the time and date is automatically entered.

The laptop and the reader equipment can be purchased off the shelf. The CCD camera is commercially available also, but the light source has been added to illuminate the marks. The packaging of the components to make it user friendly is an aspect of the present invention.

The system also captures inspection and routing information. It actually tracks the actual routing through each inspection station or check point. For example, if the routing was going to be El Paso to Dallas-Fort Worth to Atlanta to Charlotte, N.C. and the goods show up in Seattle, Wash., automatically it becomes apparent that there is a problem. Routing information may be displayed on the laptop screen so that the inspector will be informed of the goods destination and proper routing.

An audit trail is created through inspection that evidences what the field inspectors inspected and whether they check or merely spot check all of the goods. When an invalid signal is received, this information can be stored. For both valid and invalid readings, the host computer will mark the code in the database indicating it was read on a particular date at a particular location. And if that item is read two or three places along the distribution chain, all that information will be in the host and will be downloaded to the laptop at the time that the mark is read. If counterfeit or diverted goods are identified, the field unit has the software that allows a manual input of bills of lading and purchase order data and/or the fact that it was obtained after inspection.

The system thereby enhances the quality of data gathered by the reader system. This is one of the prime objectives of the present invention. The field reader can be used to scan bills of lading and/or purchase orders so that such documentation can be associated with inspected goods.

In the U.S. or in highly developed countries where a sophisticated telephone system exists, a modem serves as the means for transmitting information from the field reader to the host computer and back to the field reader. Also, in highly developed countries such as the U.S., transmission via cellular telephone is possible.

If on the other hand, inspection in third world countries is necessary, a satellite system is available that will allow the field reader to uplink to the satellite, down to a ground station, and back to the host. Whether it is the reader to the host or whether it is the printing system to the host, in terms of modems and phone lines, the internet, satellite, private phone lines, private satellite systems, any commonly known method of transmitting data may be employed. Digital data will be transmitted by the most convenient method.

While the foregoing is directed to the preferred embodiment, the scope thereof is determined by the claims which follow.

We claim:

1. A method of controlling the authentication and tracking of goods and locating counterfeit goods, the method comprising the steps of:

a) providing a control central processing unit to control and enable a host central processing unit by providing an allotment of prints to label an allotted number of goods to the host central processing unit;

b) enabling the host central processing unit to direct a printer central processing unit to print encoded symbols onto a line of goods;

c) scanning goods with at least one field reader to capture symbols imprinted thereon;

d) transferring the captured symbols to the host central processing unit;

e) comparing within the host central processing unit the captured symbols with a data base of encoded symbols; and f) transmitting to the at least one field reader an indication of the result of the comparison.

2. The method of claim 1 wherein the step of comparing the captured symbols with a data base of encoded symbols further comprises storing the scanned symbols in a field central processing unit, transmitting the scanned symbols to the host central processing unit for comparison of the scanned symbols with the data base of encoded symbols entered at the host central processing unit, and transmitting from the host central processing unit to the field central processing unit an indication of the authentication of the scanned goods.

3. The method of claim 2 wherein the step of scanning goods comprises illuminating the goods with a light source having a specified frequency range to illuminate an encoded and imprinted symbol.

4. A system for marking and inspecting goods for use in counterfeit inspection, the system comprising:
   a) a controlling device for enabling the system;
   b) a host device in communication with the controlling device for directing marking of goods and providing a data base of encoded symbols;
   c) a marking device directed by the host device, the marking device comprising
      1) a material handling mechanism to present one face of a planar material for marking; and
      2) a printer directing a print onto the face of the planar material;
      3) a mechanism for moving the material relative to the printer to form a repeating identification pattern along the material; and
   d) a pattern reading device at a location remote from the host device wherein said pattern reading device is in communication with the host device, the pattern reading device comprising
      1) a lamp for illuminating the pattern on the material;
      2) a pattern scanning device for reading the illuminated pattern; and
      3) a pattern recognizing computer connected to the pattern reading device to enable capture and transmission of the illuminated patterns to the host device for comparison with a data base of printed patterns to obtain an indication of an acceptable pattern wherein a notice of the result of the comparison is transmitted to the location of the pattern reading device.

5. The apparatus of claim 4 wherein said pattern reading device is a portable computer.

6. The apparatus of claim 5 wherein said computer has a memory input of acceptable pattern numbers.

7. A system for marking and tracking the distribution of goods, comprising:
   an enabling control central processing unit;
   a host central processing unit in communication with the control central processing unit;
   a printer central processing unit in communication with the host central processing unit;
   a field reader central processing unit remote from the host central processing unit and which is in communication with the host central processing unit; and
   a field reader in communication with the field reader central processing unit;
   wherein said control central processing unit communicates with said host central processing unit through a coded communication to enable said host central processing unit to coordinate marking of goods by providing said host with an allotment of serialized prints; and wherein said host central processing unit communicates with said printer central processing unit through a coded communication to enable said printer central processing unit to print an encoded symbol onto the goods; and
   wherein the reader central processing unit communicates with said host central processing unit to compare scanned patterns with a set of patterns entered into a data base on the host central processing unit.

8. The system of claim 7 wherein said host central processing unit is programmed to encode a set of data into a symbol which is then decoded, transmitted to the printer central processing unit, encoded at the printer central processing unit, and printed onto the goods.

9. The system of claim 7 further comprising verification means, and said verification means scans the markings applied to the goods and cross references the scanned marks with the intended mark encoded at and stored in the printer central processing unit.

10. The system of claim 7 wherein said field reader central processing unit enhances said scanned patterns prior to said communication with said central processing unit.

11. The system of claim 10 wherein the field reader scans goods observed in the field and the field reader central processing unit transmits the scanned data to the host central processing unit for verification, said host central processing unit compares the scanned mark with the marks encoded and stored in its database and said host central processing unit transmits a signal to said field central processing unit indicative of results of said comparison.

12. A system for controlling and enabling a marking and tracking system, comprising:
   a control central processing unit, said CPU being in electronic communication with a host central processing unit, and said host CPU being in communication with a printer central processing unit; and
   wherein said control CPU provides an allotment of encoded and serialized prints to said host CPU and whereby said host CPU is enabled to direct a printer CPU to mark a plurality of items wherein each item is printed with a unique identifying symbol.

13. A method of controlling and enabling an authenticating and anti-counterfeiting system, comprising the steps of:
   providing a control CPU;
   providing a host CPU wherein said control CPU communicates with said host CPU and said control CPU provides an allotment of prints to the host CPU to be used by the host CPU in directing a printer CPU to mark an allotment of goods.

14. The method of claim 13 further comprising the steps of encoding a data set into a symbol at said host CPU, downloading the data set to said printer CPU, and printing the encoded symbol representing the data set onto an allotment of goods.

15. The method of claim 14 further comprising the step of verifying the printed symbol by passing the marked goods under a camera, capturing the printed symbols, comparing the printed symbols with a data set stored in the printer CPU.

16. A method of tracking an allotment of goods, comprising:
   providing a host CPU with an allotment of prints for uniquely marking the allotment of goods from a control CPU;

providing a printer CPU with an allotment of prints for marking the allotment of goods from the host CPU;

transmitting an encoded symbol from said host CPU to said printer CPU;

directing said printer CPU to imprint said encoded symbol on the allotment of goods;

scanning said imprinted symbols and verifying valid marking;

scanning the allotment of goods for the imprinted symbol with a field reading unit thereby generating scanned symbolic data;

verifying scanned marks against a data base of encoded symbols in said host CPU by transmitting the scanned symbolic data from the field reading unit to the host CPU; and comparing said scanned symbolic data and the encoded symbols.

17. The method of claim 16 further comprising securing the communication between the control CPU and the host CPU and between the host CPU and the printer CPU.

* * * * *